United States Patent
Hayashi et al.

(10) Patent No.: US 8,315,836 B2
(45) Date of Patent: Nov. 20, 2012

(54) RADIATION MEASURING DEVICE AND DIAGNOSTIC METHOD THEREOF

(75) Inventors: Masateru Hayashi, Tokyo (JP); Kenichi Moteki, Tokyo (JP); Masakazu Nakanishi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 260 days.

(21) Appl. No.: 12/782,808

(22) Filed: May 19, 2010

(65) Prior Publication Data

US 2011/0144945 A1 Jun. 16, 2011

(30) Foreign Application Priority Data

Dec. 14, 2009 (JP) ................ 2009-282854

(51) Int. Cl.
*G06F 11/00* (2006.01)
*G06F 11/30* (2006.01)
*H04B 15/00* (2006.01)
*H04B 17/00* (2006.01)
(52) U.S. Cl. ......... 702/183; 702/189; 702/193; 702/194
(58) Field of Classification Search .......... 702/183, 702/28, 40, 79, 82, 182, 189, 193, 194; 250/374, 250/380, 390.12; 376/255, 245, 254, 256
See application file for complete search history.

(56) References Cited

U.S. PATENT DOCUMENTS

| | | | | |
|---|---|---|---|---|
| 4,631,411 | A * | 12/1986 | Noback | 250/374 |
| 5,857,463 | A * | 1/1999 | Thurston et al. | 600/436 |
| 6,470,295 | B1 * | 10/2002 | Mirow et al. | 702/176 |
| 2006/0126776 | A1 * | 6/2006 | Izumi et al. | 376/255 |

FOREIGN PATENT DOCUMENTS

| | | |
|---|---|---|
| JP | 62-108180 A | 5/1987 |
| JP | 6-324158 A | 11/1994 |
| JP | 10-282241 A1 | 10/1998 |
| JP | 2001-215279 A | 8/2001 |
| JP | 2002-357659 A | 12/2002 |
| JP | 2004-093456 A | 3/2004 |
| JP | 2008-215907 A | 9/2008 |
| JP | 2009-063351 A | 3/2009 |

OTHER PUBLICATIONS

Office Action dated Apr. 24, 2012 from Japanese Patent Office issued in corresponding Japanese Patent Application No. 2009-282854, with English translation thereof.

* cited by examiner

*Primary Examiner* — Mohamed Charioui
*Assistant Examiner* — Ricky Ngon
(74) *Attorney, Agent, or Firm* — Buchanan Ingersoll & Rooney PC (57) ABSTRACT

A radiation measuring device includes a computing unit that receives an input of a count value of a count portion configured to receive an input of a digital pulse from a pulse height discriminator and count the digital pulse in a fixed cycle and an integrated value of an adder-subtractor accumulation portion configured to add the digital pulse and subtract a feedback pulse and finds a first current rate on the basis of the count value and the integrated value and a second count rate on the basis of the integrated value, so that soundness of the adder-subtractor accumulation portion is diagnosed and outputted by comparing the first count rate with the second count rate. A radiation measuring device of a simple configuration and a diagnosis method thereof enabling a high-accurate self-diagnosis online on the count rate measurement that is the keystone of the radiation measurement can be thus obtained.

11 Claims, 11 Drawing Sheets

RADIATION MEASURING DEVICE AND DIAGNOSTIC METHOD THEREOF

BACKGROUND OF THE INVENTION

1. Field of the Invention

The present invention relates to a radiation measuring device forming a radiation monitor used for emission management or radiation management in a nuclear reactor installation and a spent fuel reprocessing facility and to a diagnostic method thereof.

2. Background Art

A requirement for a radiation measuring device used in a nuclear reactor installation, a spent fuel reprocessing facility, and so forth is an ability to enable measurement covering a broad range of the input repetition frequency of a signal pulse as the detection result of radiation in the order of 10 cpm to $10^7$ cpm. In order to eliminate discontinuity accompanying range switching, count rate measurement using an up/down counter operating at a high speed in a broad range without switching ranges is carried out. According to this measuring method, a count rate is computed by reading an integrated value when an addition input of the up/down counter and a subtraction input following with a first order lag of a time constant are balanced by a computing unit in a fixed cycle, and this method is characterized particularly in that a high count rate can be measured. An example is described in JP-A-2008-215907.

When an online diagnostic is made on the count rate measurement using an up/down counter from the outside, for example, a pulse height analyzer and a controller are used. Upon input of a signal pulse from a detector, the pulse height analyzer measures a spectrum for a predetermined measurement time. Meanwhile, the spectrum data from the pulse height analyzer and the count rate of the computing unit are inputted into the controller. The controller finds an integrated count within a predetermined pulse height range on the basis of the spectrum data and then divides the integrated count by the measurement time to find a count rate. A diagnosis is made by comparing the count rate thus found with the count rate of the computing unit. Examples are described in JP-A-2001-215279 and JP-A-6-324158.

However, because of the configuration as described above, the radiation measuring device in the related art has a problem that the scale of the device becomes large. In addition, in order to make a high-accurate diagnosis, the controller has to control the up/down counter and the pulse height analyzer to be in synchronization with each other so that pulse trains in the same time zone of the same time axis are captured as an input to the up/down counter and an input to the pulse height analyzer. However, because the time constant of the up/down counter varies in real time, it is, in principle, difficult to bring the captured pulse train of the up/down counter into coincidence with the captured pulse train of the pulse height analyzer. This difficulty raises another problem that a diagnostic accuracy cannot be improved.

SUMMARY OF THE INVENTION

The invention was devised to solve the problems discussed above and has an object to provide a radiation measuring device of a simple configuration that enables a high-accurate self-diagnosis online on the count rate measurement that is the keystone of the radiation measurement and a diagnostic method thereof.

A radiation measuring device according to an aspect of the invention includes: a pulse height discrimination portion that receives an input of an analog signal pulse as a detection result of radiation by a radiation detector and outputs digital pulse when the analog signal pulse satisfies a predetermined pulse height condition; a count portion that receives an input of the digital pulse and outputs a count value by counting the digital pulse in a fixed cycle; an adder-subtractor accumulation portion that receives an addition input of the digital pulse outputted from the pulse height discrimination portion and a subtraction input of a feedback pulse and outputs a result as an integrated value; an accumulation control portion that performs control in such a manner that the pulses inputted into the adder-subtractor accumulation portion are counted with a weight on the basis of a standard deviation; a pulse generation portion that outputs a pulse having a repetition frequency corresponding to the integrated value upon input of the integrated value to the adder-subtractor accumulation portion as the feedback pulse; and a computing portion that receives an input of a count value of the count portion and an input of the integrated value of the adder-subtractor accumulation portion in a fixed cycle, finds a first count rate on the basis of the count value of the count portion and the integrated value of the adder-subtractor accumulation portion and a second count rate on the basis of the integrated value of the adder-subtractor accumulation portion, and compares the first count rate with the second count rate to make and output a diagnosis on soundness of the adder subtractor accumulation portion.

A diagnostic method of a radiation measuring device according to another aspect of the invention is a diagnosis method of a radiation measuring device configured to convert an output pulse of a radiation detector to a digital pulse, add the digital pulse and subtract a feedback pulse by an up/down counter to output a result as an integrated value M, and output a pulse having a repetition frequency corresponding to the integrated value M as the feedback pulse while computing a count rate m on the basis of the integrated value M. The diagnostic method includes: a first step of reading an integrated value M(current) of the up/down counter and a count value N(current) of a counter that counts the digital pulse in a current computation cycle; a second step of finding a count rate m(current) on the basis of the integrated value M(current); a third step of finding an integrated value Q(current) on the basis of the count value N(current) and finding a count rate n(current) on the basis of the integrated value Q(current); and a fourth step of outputting a diagnosis result of PASS when count rate m (current)/count rate n(current) is within 1±k, where k is a value smaller than 1, and a diagnosis result of FAIL when count rate m(current)/count rate n(current) is outside 1±k.

According to the configurations described above, soundness of the adder-subtractor accumulation portion is diagnosed and outputted by comparing the first count rate with the second count rate. It thus becomes possible to provide an inexpensive, highly reliable device of a simple configuration that enables a high-accurate self-diagnosis online on the count rate measurement that is the keystone of the radiation measuring device.

The foregoing and other object, features, aspects, and advantages of the present invention will become more apparent from the following detailed description of the present invention when taken in conjunction with the accompanying drawings.

DETAILED DESCRIPTION

First Embodiment

Figure 1:
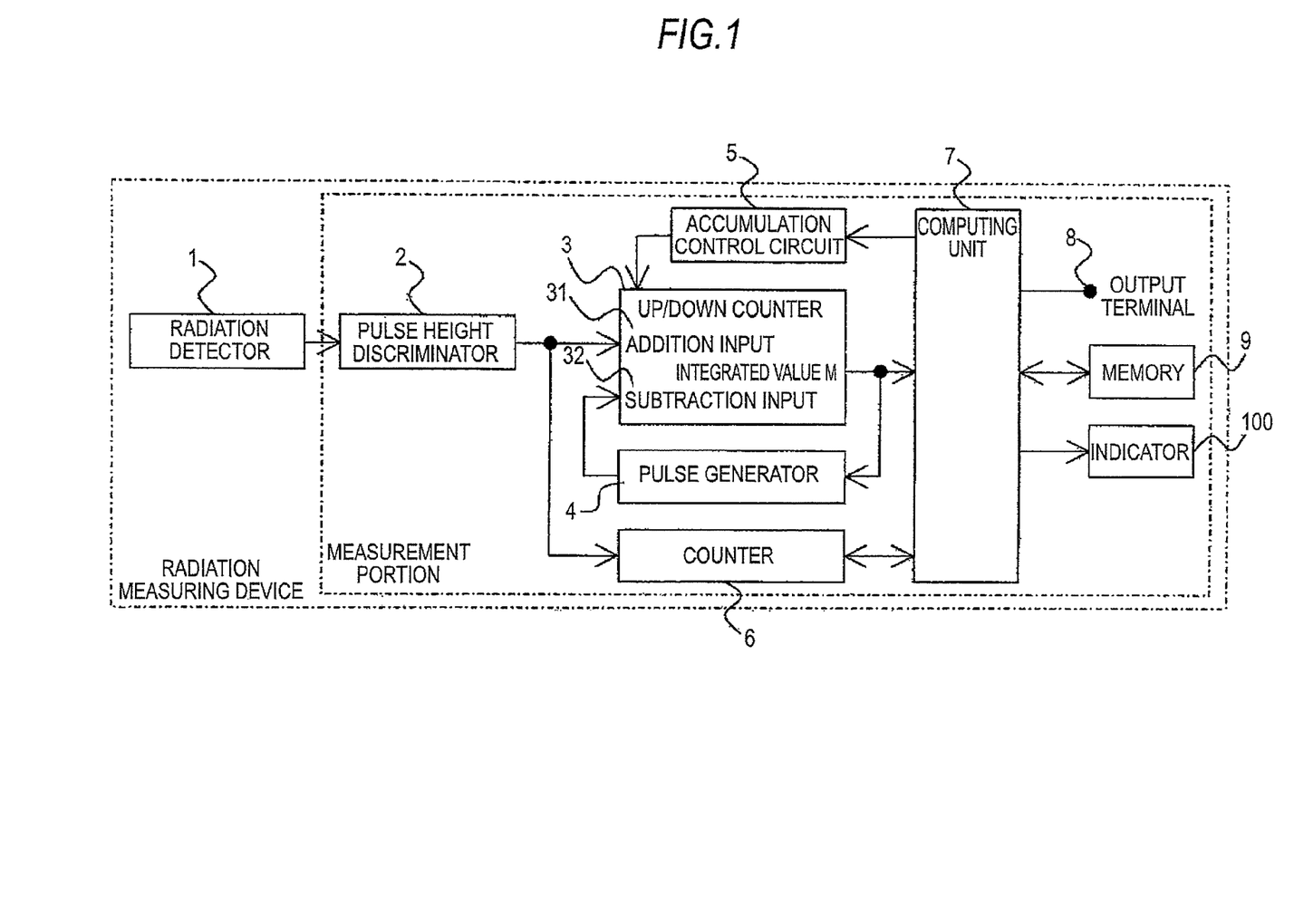
FIG. 1 is a block diagram of a first embodiment of the invention.

Hereinafter, a first embodiment of the invention will be described on the basis of the drawings. Referring to FIG. 1, a radiation detector 1 outputs an analog signal pulse upon detection of radiation and a pulse height discriminator 2 receives an input of the analog signal pulse outputted from the radiation detector 1 and outputs a digital pulse in a case where a voltage level of the analog signal pulse is as high as or higher than a predetermined level or within an allowable range. An up/down counter 3 receives an input of a digital pulse outputted from the pulse height discriminator 2 at an addition input 31 and an input of a digital pulse outputted from a pulse generator 4 at a subtraction input 32 in a fixed cycle and thereby outputs the result as an integrated value. M.

An accumulation control circuit 5 controls the up/down counter 3 to count the pulses inputted to the addition input 31 and the subtraction input 32 of the up/down counter 3 by adding a weight on the basis of a standard deviation σ. The pulse generator 4 receives an input of the integrated value M outputted from the up/down counter 3 and converts the integrated value M to a repetition frequency that is inputted into the subtraction input 32 of the up/down counter 3. A counter 6 receives an input of the digital pulse outputted from the pulse height discriminator 2 and counts the digital pulse in a fixed cycle to output a count value N. A computing unit 7 receives the integrated value M outputted from the up/down counter 3 and the count value N outputted from the counter 6 in a fixed cycle and finds a count rate m and a count rate n on the basis of the integrated value, and performs engineering value conversion and warning determination on the basis of the count rate m and the count rate n to output a radiation measurement value and a warning from a measurement value output terminal 8. A memory 9 stores a computing portion and setting values necessary for a computation by the computing unit 7 as well as a computation result. An indicator 100 indicates the radiation measurement value and the warning outputted from the computing unit 7.

A response of the count rate outputted from the computing unit 7 for the repetition frequency inputted into the up/down counter 3 will now be described. The up/down counter 3 receives an input of a digital pulse at a repetition frequency $F_{IN}$ outputted from the pulse height discriminator 2 at the addition input 31 and an input of a digital pulse at a repetition frequency $F_B$ outputted from the pulse generator 4 at the subtraction input 32 as a feedback pulse and outputs the result to both the pulse generator 4 and the computing unit 7 as the integrated value M. Upon input of the integrated value M, the pulse generator 4 outputs the digital pulse at the repetition frequency $F_B$ expressed by Equation (1) below. Likewise, upon input of the integrated value M, the computing unit 7 computes the count rate m in accordance with Equation (1) below. The computing unit 7 determines a weight of the count in the accumulation control circuit 5 on the basis of the pre-set standard deviation σ. Herein, $F_B$ and m respond so as to come to equilibrium with $F_{IN}$ by following with a first order delay of a time constant τ.

$$F_B = m = e^{\gamma M} = 2^{\gamma M / \ln 2} \quad (1)$$

$$\sigma = 1/(2m\tau)^{1/2} = (\nu/2)^{1/2} \quad (2)$$

$$\tau = 1(2m(M)\sigma^2) \quad (3)$$

$$\nu = 2\sigma^2 = 2^{-\lambda} \ln 2 \quad (4)$$

$$\alpha = 11 - \lambda \quad (5)$$

For example, let λ in Equation (4) above be 11, 9, 7, and 5, then, as is expressed by Equation (2) above, the standard deviation σ is found to be 1.3%, 2.6%, 5.2%, and 10.4%, respectively. In Equation (4) above, let λ be 9, 7, and 5, then γ is increased by a factor of $2^2$, $2^4$, and $2^6$, respectively, with reference to λ=11. Also, as is expressed by Equation (2) above, the standard deviation σ is increased by a factor of $2^1$, $2^2$, and $2^3$, respectively, and as is expressed by Equation (3) above, the time constant τ is increased by a factor of $2^{-2}$, $2^{-4}$, and $2^{-6}$, respectively.

When γ is increased by a factor of $2^\alpha$ while m remains constant as is expressed by Equation (1) above, M comes to equilibrium when increased by a factor of $2^{-\alpha}$. In order to prevent M from varying even when γ is changed while m remains constant, in a case where γ is increased by a factor of $2^\alpha$, the up/down counter 3 counts the pulse by increasing a weight per pulse by a factor of $2^\alpha$. More specifically, when one digital pulse outputted from the pulse height discriminator 2 is inputted to the addition input 31 of the up/down counter 3, M is counted by adding only $2^\alpha$. On the contrary, when one digital pulse outputted from the pulse generator 4 is inputted to the subtraction input 32 of the up/down counter 3, M is counted by subtracting only $2^\alpha$. Consequently, the integrated value M is found to be a value obtained by multiplying an integrated value P, which is a difference between the addition input and the subtraction input, by $2^\alpha$. Herein, let α be 0 or a positive integer and λ be 11, 9, 7, and 5 as is expressed by Equation (5) above, then 0, 2, 4, and 6 are given as α. For example, when λ is 11, one count is added or subtracted for an input of one pulse and M and P become equal. When λ is 9, four counts are added or subtracted for an input of one pulse and M and 4P become equal.

Hence, a change to increase γ by a factor of $2^\alpha$ in Equation (1) above is equal to a change to increase the weight of a count by a factor of $2^\alpha$. Accordingly, the count rate n can be found in accordance with Equation (1) above on the basis of the integrated value M, which is the result with a weight increased by a factor of $2^\alpha$, and γ corresponding to the reference, λ=11(α=0). By controlling the weight of a count in the up/down counter 3 by the accumulation control circuit 5 in this manner, the standard deviation σ can be readily changed. In addition, because the integrated value M does not vary even when the standard deviation is σ changed, the response characteristic can be changed without changing the center value of indication during measurement. Equation (1) above may be a broken line approximation for certain reasons of circuits, for example, because an output pulse of the pulse generator 4 is synthesized into a clock pulse, or for certain reasons of computation processing.

Figure 2:
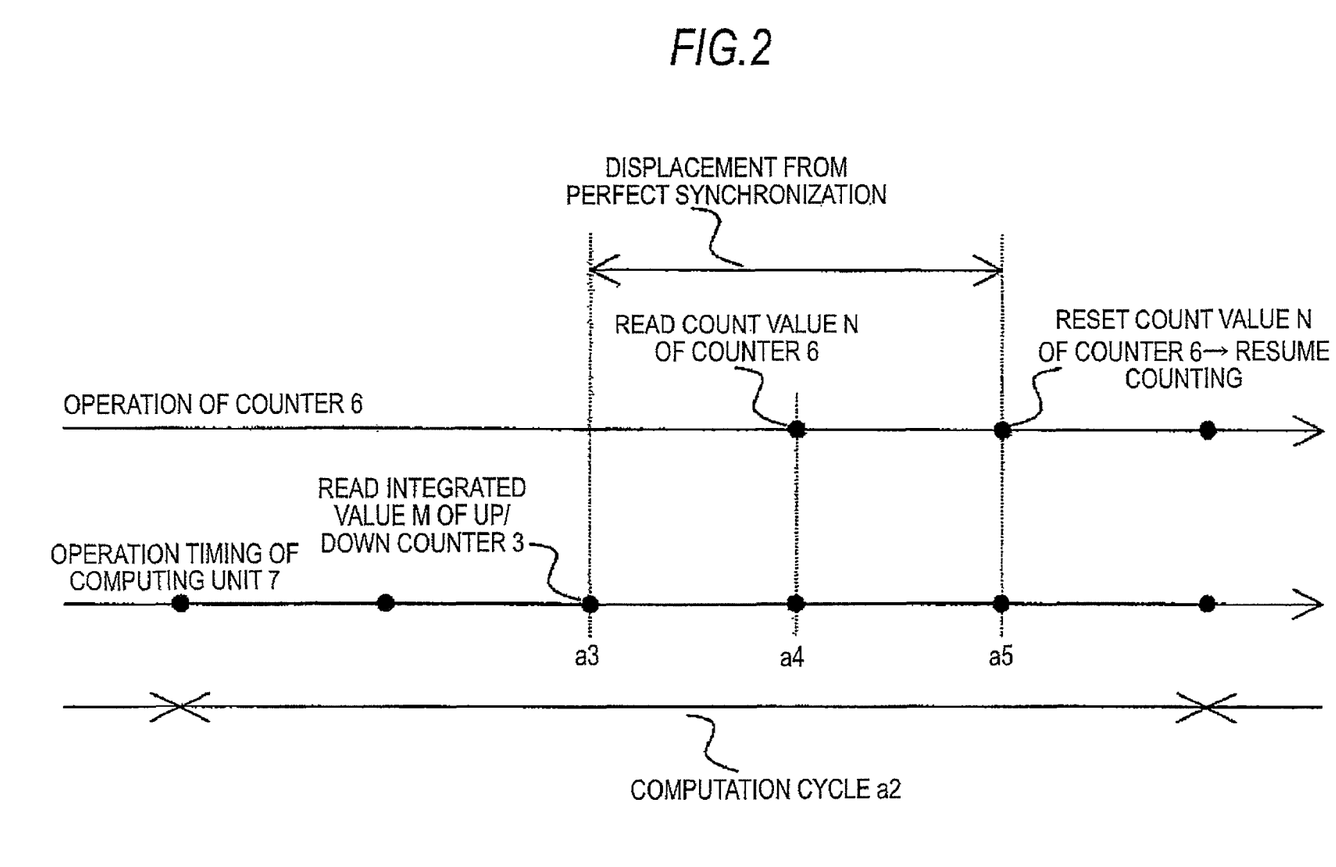
FIG. 2 is a time chart of the first embodiment of the invention.

FIG. 2 is a time chart of the first embodiment. Reading of the integrated value M of the up/down counter 3 and the count value N of the counter 6 by the computing unit 7 is controlled sequentially in a cycle a1 of an internal clock (not shown) of the computing unit 7. For example, in a computation cycle a2 of interest, the count value N is read at timing a4 following timing a3 that is the read timing of the integrated value M, and the counter 6 is reset at timing a5 to resume the counting. Let the clock be 4 MHz, then displacement from the perfect synchronization is a total of two clocks, that is, as negligibly small as 0.5 μsec.

Figure 3:
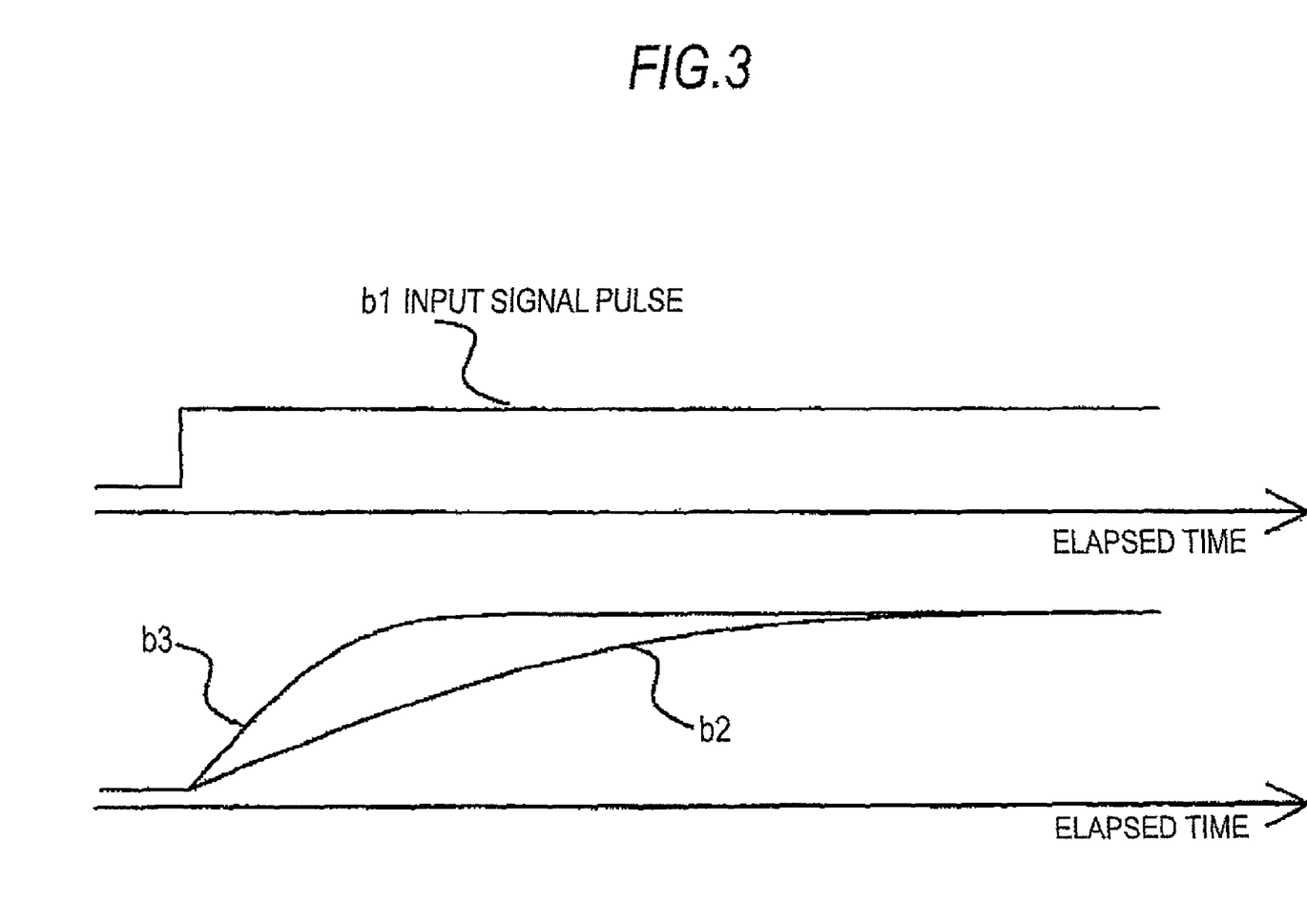
FIG. 3 is a conceptual view of an input and output characteristic of the first embodiment of the invention.

FIG. 3 is a conceptual view of an input and output characteristic of the first embodiment. Herein, b1 represents a step-wise change of the repetition frequency $F_B$ of the input signal pulse, b2 represents a response of the count rate m for the standard deviation of 2.6%, and b3 represents a response of the count rate m for the standard deviation of 5.2%. The drawing shows that the count rate m responds to an elapsed time in the form of an exponent function and the count rate m responds faster as the standard deviation σ becomes greater.

Meanwhile, the count rate n(current) of the current computation cycle is found in accordance with Equation (7) below using an integrated value Q(current) in the current computation cycle. The integrated value Q(current) is found in accordance with Equation (6) below using the count value N(current) of the counter 6 in the current computation cycle, the count value M(last) of the up/down counter 3 in the last computation cycle, the count rate m(last), and the time of the M computation cycle, ΔT.

Herein, Q(current) corresponds to the integrated value M(current) of the up/down counter 3 in the current computation cycle.

Also, n(current) can be found in accordance with Equation (8) below on the basis of M(current).

$$Q(\text{current}) = M(\text{last}) + 2^\alpha \times \{N(\text{current}) - m(\text{last}) \times \Delta T\} \quad (6)$$

$$n(\text{current}) = e^{\gamma Q(\text{current})} = 2^{\gamma Q(\text{current})/\ln 2} \quad (7)$$

$$m(\text{current}) = e^{\gamma M(\text{current})} = 2^{\gamma M(\text{current})/\ln 2} \quad (8)$$

Figure 4:
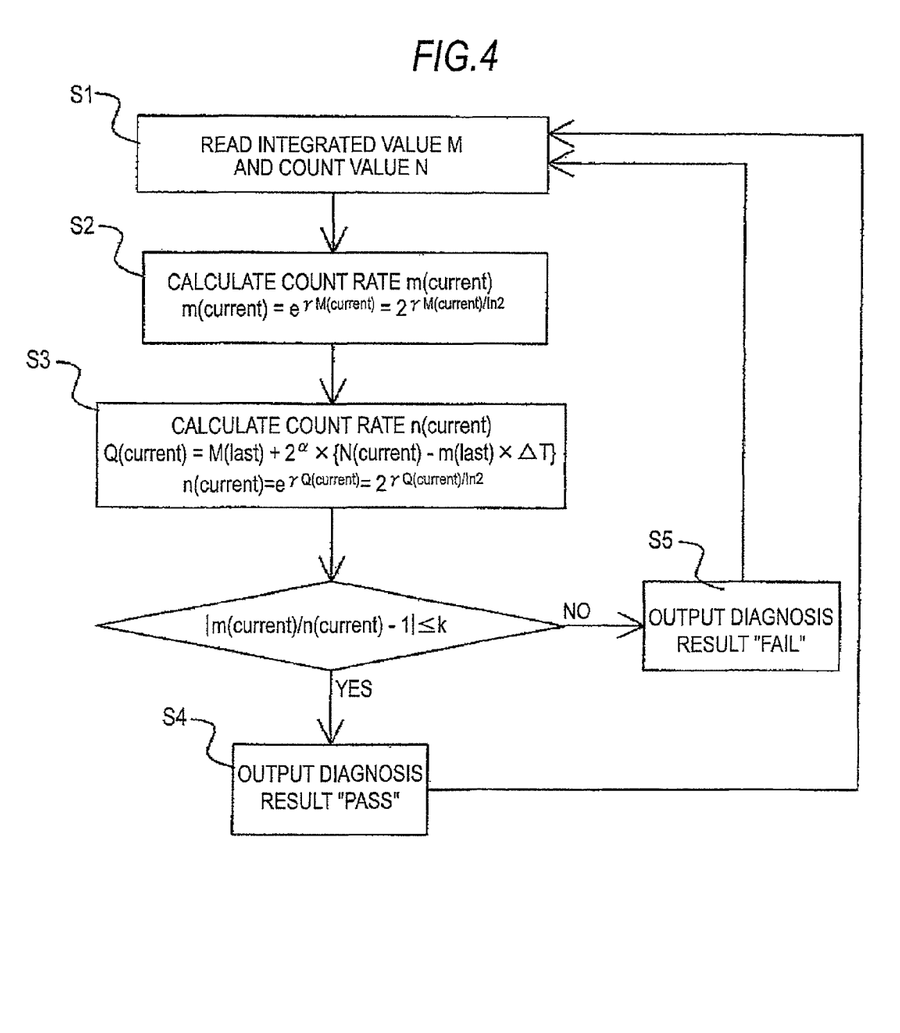
FIG. 4 is a flowchart of the first embodiment of the invention.

FIG. 4 is a flowchart of a computation procedure of the first embodiment. The computing unit 7 reads the integrated value M(current) of the up/down counter 3 and the count value N(current) of the counter 6 in the current computation cycle (S1). Subsequently, the computing unit 7 finds the count rate m(current) in accordance with Equation (8) above on the basis of M(current) (S2). The computing unit 7 then finds the integrated value Q(current) in accordance with Equation (6) above on the basis of N(current) and finds the count rate n(current) in accordance with Equation (7) above on the basis of Q(current) (S3). In a case where m(current)/n(current) is within 1±k, the computing unit 7 outputs "PASS" as the diagnosis result and returns to S1 (S4). In a case where m(current)/n(current) is outside 1±k, the computing unit 7 outputs "FAIL" as the diagnosis result and returns to S1 (S5). Herein, k is a value smaller than 1. Although k includes resolution of the count rate measurement and an inevitable error, it is set to be equal to or smaller than a value three times greater than the standard deviation σ.

As has been described, according to the first embodiment of the invention, the count rate measurement by the up/down counter 3 and the count rate measurement by the counter 6 are carried out in parallel and soundness of the count rate measurement by the up/down counter 3 is diagnosed by comparing the both count rates and the diagnosis result is outputted. Hence, it becomes possible to provide an inexpensive, highly reliable device of a simple configuration that enables a high-accuracy self-diagnosis in real time on the count rate measure that is the keystone of the radiation measuring device.

Second Embodiment

In the first embodiment above, the count value of the counter 6 is read in a fixed cycle by the computing unit 7 and the counter 6 is then reset to resume the counting. By contrast, in a second embodiment, as is shown in the time chart of FIG. 5, the reading is controlled sequentially by a pulse c1 of an internal clock (not shown) of the computing unit 7, and, for example, the count value N is read at timing c4 following timing c3 that is the read timing of the integrated value M in a computation cycle c2 of interest.

Figure 5:
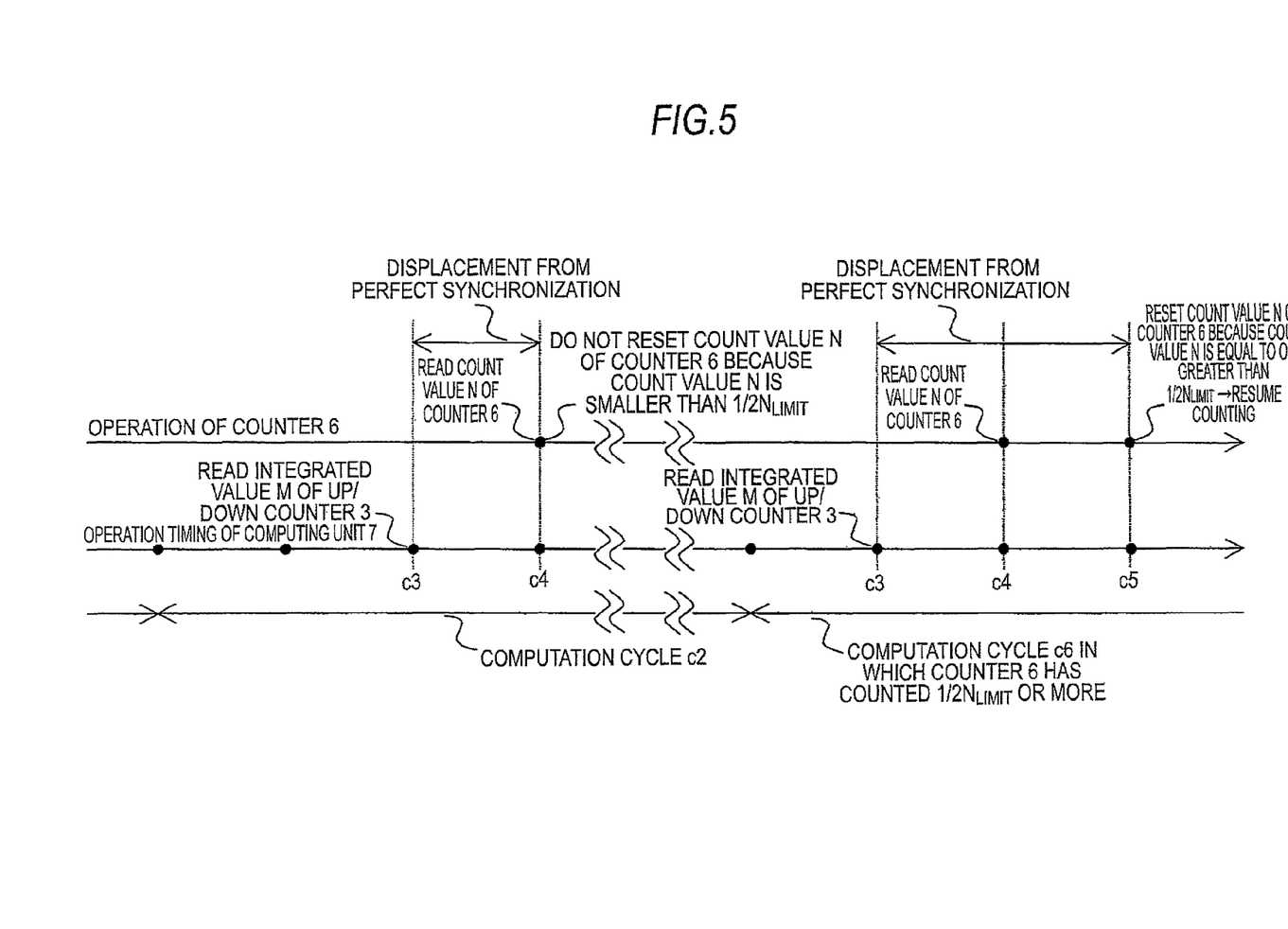
FIG. 5 is a time chart of a second embodiment of the invention.
Figure 6:
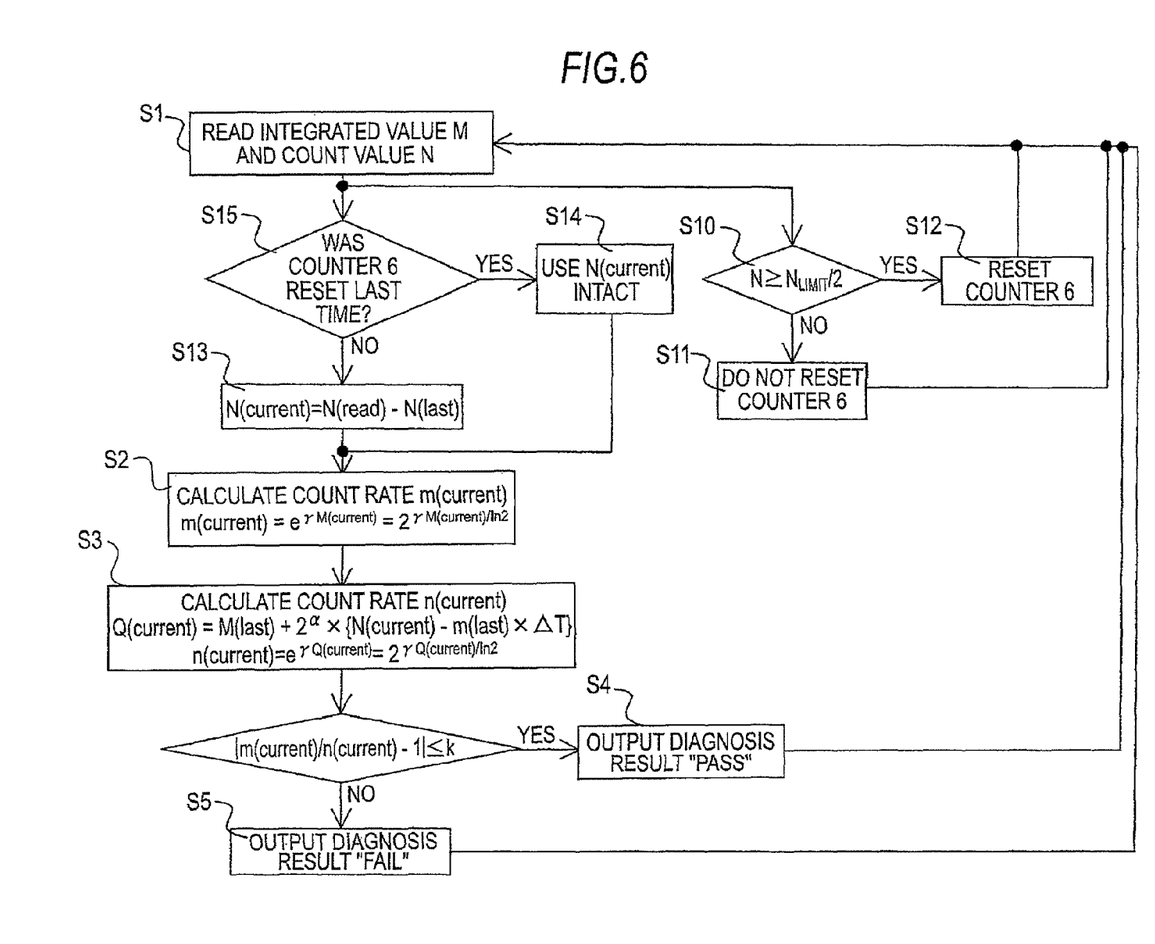
FIG. 6 is a flowchart of the second embodiment of the invention.

In the flowchart of FIG. 6, when N is near an overflow limit value $N_{LIMIT}$, for example, smaller than $½N_{LIMIT}$ (S11), the computing unit 7 returns to S1 without resetting the counter 6. When the count 6 has counted $½N_{LIMIT}$ or more (S12), the computing unit 7 resets the counter 6 at timing c5 following timing c4 in a computation cycle c6 in which the counter 6 has counted $½N_{LIMIT}$ or more to resume the counting from the start and returns to Step S1. There are two calculation methods of N(current) depending on whether the counter 6 is reset in the computation cycle (S15). More specifically, in a case where the counter 6 is reset, the value of the read N is used intact as the value of N(current) (S14). In a case where the counter 6 is not reset, a value found by subtracting the value of N(last) from the value of the read N is used as the value of N(current) (S13). By setting the overflow limit of the counter 6 to a sufficiently large value, the counter 6 is rarely reset and displacement from perfect synchronization is one clock. Herein, let the clock be 4 MHz, then the displacement is reduced to 0.25 μsec. Hence, a self-diagnosis at a higher degree of accuracy is enabled in real time.

Third Embodiment

Figure 7:
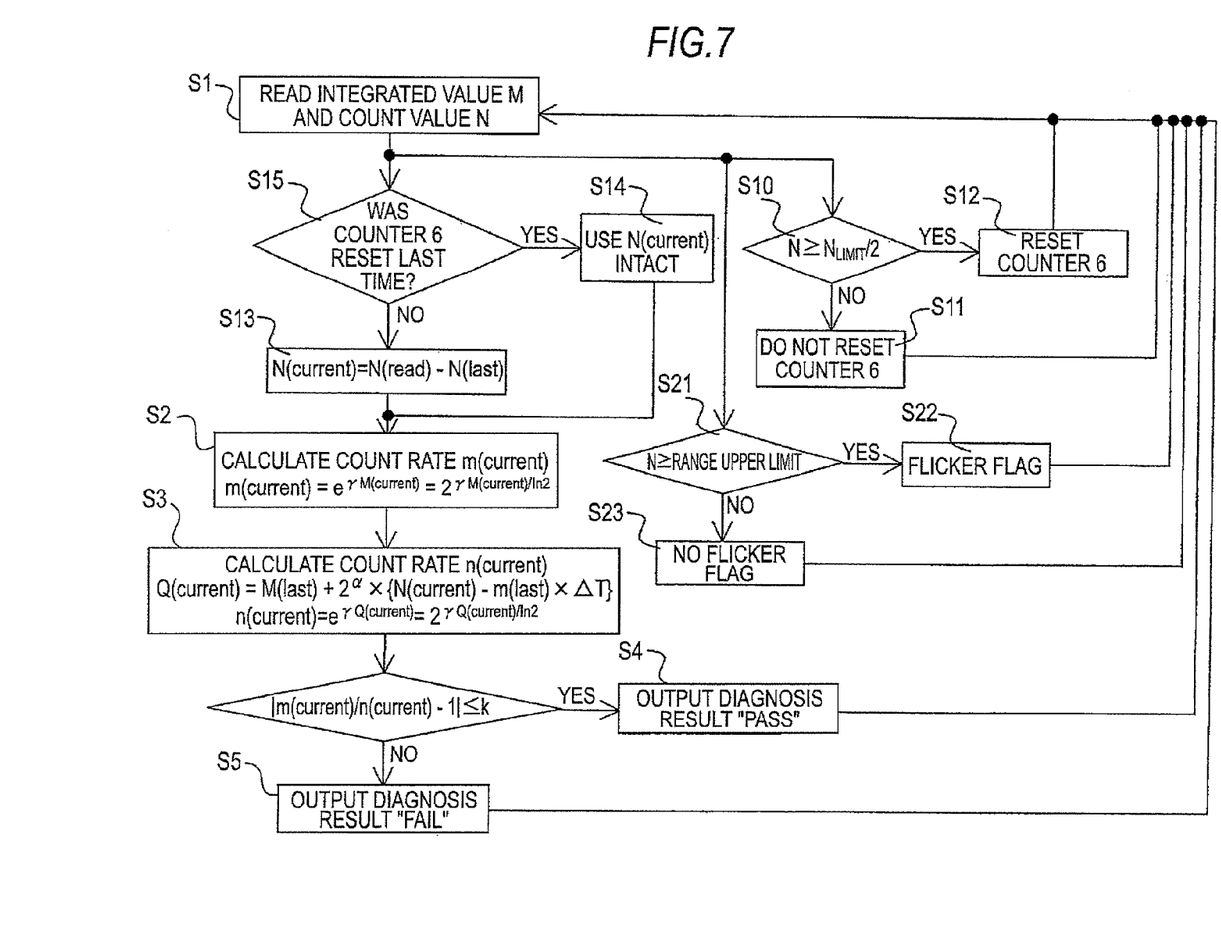
FIG. 7 is a flowchart of a third embodiment of the invention.

In the first and second embodiments above, the radiation measurement value is indicated by the indicator 100 without a flicker. By contrast, in a third embodiment described with reference to the flowchart of FIG. 7, in a case where a net count value of the pulses inputted into the counter 6 in a computation cycle of interest is equivalent to or above the upper limit of the radiation measurement range (S21), the computing unit 7 sets a flag of a flicker to the radiation measurement value to be outputted to the indicator 100 from the computing unit 7 and returns to S1 (S22). In a case where the net count value is below the upper limit of the radiation measurement range (S23), the computing unit 7 sets no flag of a flicker to the radiation measurement value to be outputted to the indicator 100 from the computing unit 7 and returns to S1 (S24). Hence, the radiation measurement indicated by the indicator 100 can be visualized so that an individual can understand by a glance whether the radiation measurement is indicated by a reliable value within the measurement range.

Fourth Embodiment

Figure 8:
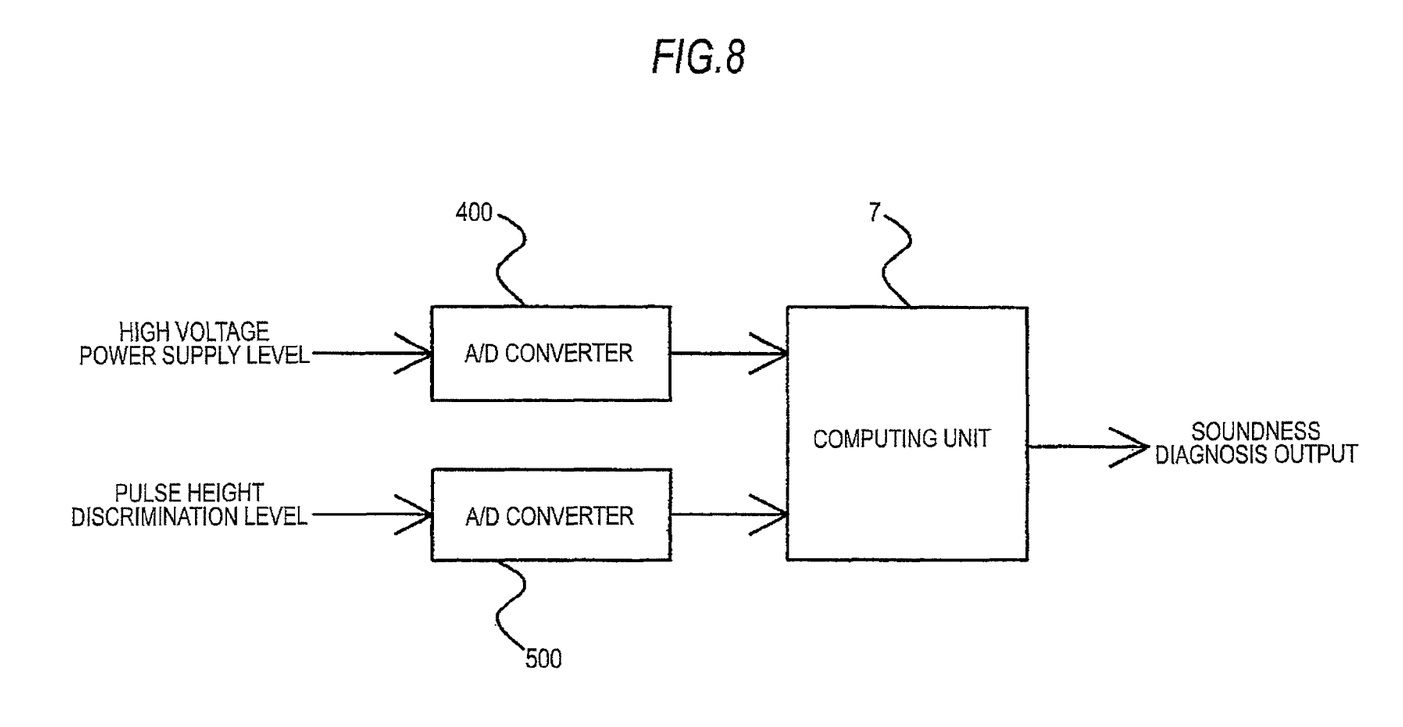
FIG. 8 is a block diagram of a fourth embodiment of the invention.

In a fourth embodiment, as is shown in the block diagram of FIG. 8, a voltage level of a high voltage power supply to be supplied to the radiation detector 1 is inputted into a first A/D converter 400 to convert the voltage level to digital data, and a pulse height discrimination level of the pulse height discriminator 2 is inputted into a second A/D converter 500 to convert the pulse height discrimination level to digital data. Each digital data is inputted into the computing unit 7, so that a diagnosis is made in a fixed cycle as to whether each digital data is within a predetermined allowable range. Hence, soundness of the high voltage power supply and the pulse height discriminator can be diagnosed in real time. Because a DC power supply can be diagnosed indirectly by making a diagnosis on the high voltage power supply, it becomes possible to make a comprehensive diagnosis covering all device malfunction causes of the radiation measuring device.

Fifth Embodiment

Figure 9:
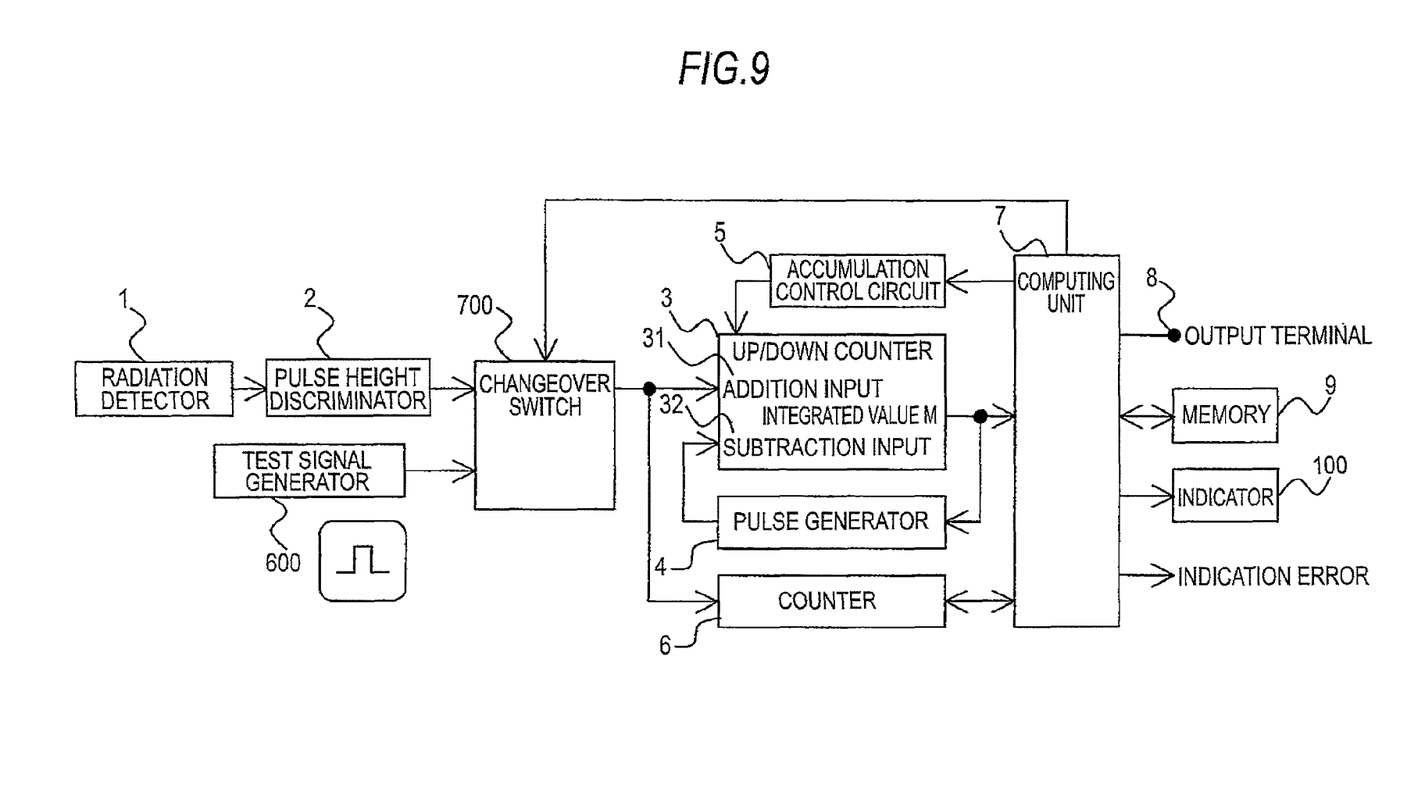
FIG. 9 is a block diagram of a fifth embodiment of the invention.

In a fifth embodiment, as is shown in the block diagram of FIG. 9, a test signal generator 600 that generates a test signal and a changeover switch 700 that makes a switching between a detector signal and the test signal are provided. The computing unit 7 computes the count rate n as a test input count rate by switching the changeover switch 700 to a test signal input during a test and also finds a ratio of the count rate m with respect to the count rate n to carry out a count rate indication error computation. Hence, because the frequency of the test signal can be measured without connecting a measuring unit, a simple but highly reliable test can be conducted. Because a moving average value of several times is indicated as an indication error, it becomes possible to conduct a test with a higher degree of accuracy.

Sixth Embodiment

Figure 10:
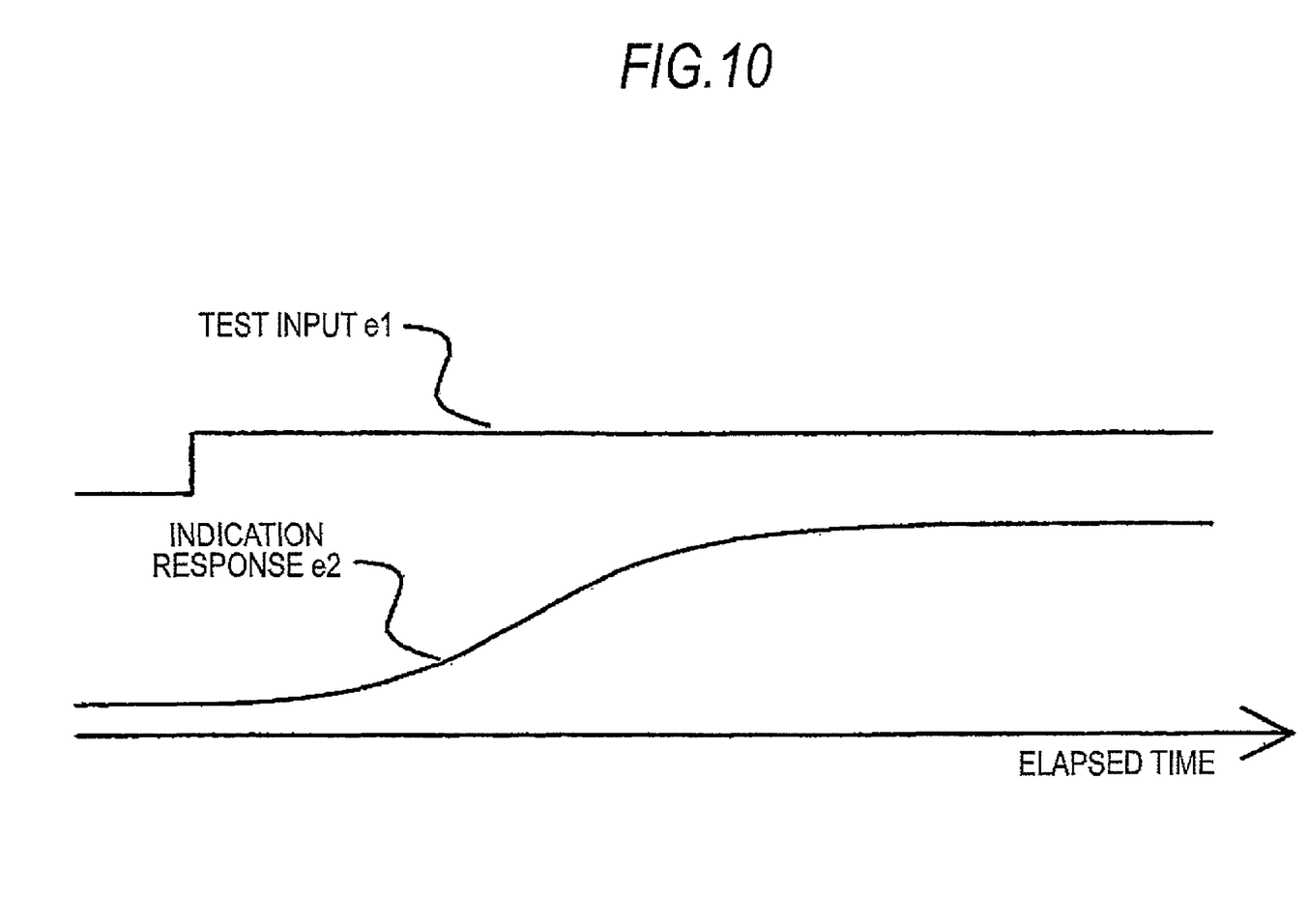
FIG. 10 shows trends in a sixth embodiment of the invention.

In a sixth embodiment, as is shown in the trends of FIG. 10, trends of a test input e1 and an indication response e2 are shown on the indicator 100. Hence, because an indication error is evaluated after the indication response is stabilized, it becomes possible to conduct a test at a higher degree of accuracy.

Seventh Embodiment

Figure 11:
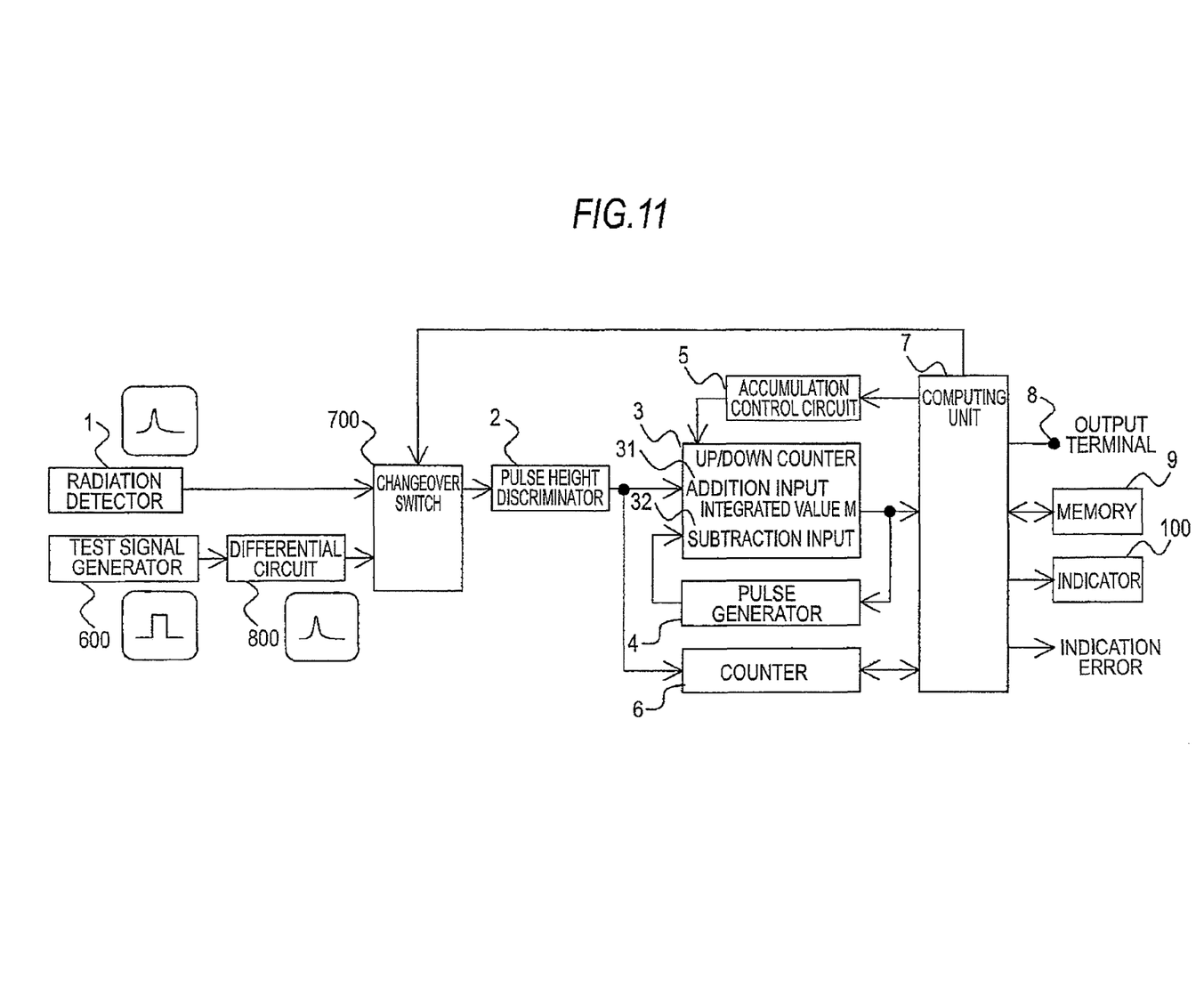
FIG. 11 is a block diagram of a seventh embodiment of the invention.

In a seventh embodiment, as is shown in FIG. 11, a test signal generator 600 capable of generating a test signal, a differential circuit 800 that converts an output of the test signal generator 600 to a simulated pulse that simulates a detection output pulse of the radiation detector 1, and a changeover switch 700 capable of making a switch between the detection output pulse of the radiation detector 1 and the simulated pulse signal are provided. Soundness of the pulse height discriminator 2 can be confirmed by switching the changeover switch 700 to a simulated pulse input by the computing unit 7 during a test to vary the pulse height value of the simulated pulse. It thus becomes possible to conduct a test at a higher degree of accuracy.

Various modifications and alterations of this invention will be apparent to those skilled in the art without departing from the scope and spirit of this invention, and it should be understood that this is not limited to the illustrative embodiments set forth herein.

What is claimed is:

1. A radiation measuring device, comprising:
  a pulse height discrimination portion that receives an input of an analog signal pulse as a detection result of radiation by a radiation detector and outputs a digital pulse when the analog signal pulse satisfies a predetermined pulse height condition;
  a count portion that receives an input of the digital pulse and outputs a count value by counting the digital pulse in a fixed cycle;
  an adder-subtractor accumulation portion that receives an addition input of the digital pulse outputted from the pulse height discrimination portion and a subtraction input of a feedback pulse and outputs a result as an integrated value;
  an accumulation control portion that performs control in such a manner that the digital pulse and the feedback pulse inputted into the adder-subtractor accumulation portion are counted with a weight on the basis of a standard deviation;
  a pulse generation portion that outputs a pulse having a repetition frequency corresponding to the integrated value to the adder-subtractor accumulation portion upon input of the integrated value as the feedback pulse; and
  a computing portion that receives an input of a count value of the count portion and an input of the integrated value of the adder-subtractor accumulation portion in a fixed cycle, finds a first count rate on the basis of the count value of the count portion and the integrated value of the adder-subtractor accumulation portion and a second count rate on the basis of the integrated value of the adder-subtractor accumulation portion, and compares the first count rate with the second count rate to make and output a diagnosis on an accuracy of the adder-subtractor accumulation portion.

2. The radiation measuring device according to claim 1, wherein:
  the computing portion reads the count value of the count portion and does not reset the count portion in a fixed cycle but resets the count portion in a case where the count value of the count portion exceeds a predetermined value near an overflow limit value.

3. The radiation measuring device according to claim 1, wherein:
  in a case where the count value of the count portion is greater than or equal to an upper limit of a radiation measurement range, an indicated value of an output of the computing portion is flickered.

4. The radiation measuring device according to claim 1, further comprising:
  a first A/D converter that receives an input of a voltage level of a high voltage power supply to be supplied to the radiation detector and converts the voltage level to digital data; and
  a second A/D converter that converts a pulse height discrimination level of the pulse height discrimination portion to digital data,
  wherein each digital data is inputted into the computing portion to make a diagnosis in a fixed cycle.

5. The radiation measuring device according to claim 1, further comprising:
  a test signal generator that generates a test signal; and
  a changeover switch that switches between a signal from the radiation detector and the test signal,
  wherein the computing portion switches the changeover switch to a test signal input during a test and performs a computation of an indication error using the first count rate as a test input count rate and indicates an indication error.

6. The radiation measuring device according to claim 5, wherein:
  the computing portion indicates a moving average value of several times as the indication error.

7. The radiation measuring device according to claim 5, wherein:
trends of a test input and an indication response are indicated.

8. The radiation measuring device according to claim 1, further comprising:
a simulated pulse generator that outputs a simulated pulse simulating an output pulse of the radiation detector; and
a changeover switch that switches between the output pulse of the radiation detector and the simulated pulse,
wherein the computing portion switches the changeover switch to a simulated pulse input during a test and changes a pulse height of the simulated pulse.

9. A diagnostic method of a radiation measuring device configured to convert an output pulse of a radiation detector to a digital pulse, add the digital pulse and subtract a feedback pulse by an up/down counter to output a result as an integrated value M, and output a pulse having a repetition frequency corresponding to the integrated value M as the feedback pulse while computing a count rate m on the basis of the integrated value M, comprising:
a first step of reading by the radiation measuring device an integrated value M(current) of the up/down counter and a count value N(current) of a counter that counts the digital pulse in a current computation cycle;
a second step of finding a count rate m(current) on the basis of the integrated value M(current);
a third step of finding an integrated value Q(current) on the basis of the count value N(current) and finding a count rate n(current) on the basis of the integrated value Q(current); and
a fourth step of outputting a diagnosis result of PASS when count rate m(current)/count rate n(current) is within plus or minus k, where k is a value smaller than 1, and a diagnosis result of FAIL when count rate m(current)/count rate n(current) is outside plus or minus k.

10. The diagnosis method of a radiation measuring device according to claim 9, wherein:
determining whether the count value N(current) is a value near an overflow limit value, and when the count value N(current) is smaller than the value near the overflow limit value, a flow sequence returns to the first step without resetting the counter and when the count value N(current) is equal to or greater than the value near the overflow limit value, the counter is reset to resume counting from a start and the flow sequence returns to the first step.

11. The diagnosis method of a radiation measuring device according to claim 9, wherein:
determining whether a net count value of the digital pulse inputted into the counter is greater than or equal to an upper limit of a radiation measurement range and when the net count value is greater than or equal to the radiation measurement range upper limit, a flag of a flicker is set to a radiation measurement value to be indicated and a flow sequence returns to the first step, and when the net count value is below the upper limit of the radiation measurement range, no flag of a flicker is set to the radiation measurement value to be indicated and the flow sequence returns to the first step.

* * * * *